United States Patent
Long

(10) Patent No.: US 12,440,607 B2
(45) Date of Patent: Oct. 14, 2025

(54) MULTIFUNCTIONAL CROSSLINKERS: COMPOUNDS, COMPOSITIONS, AND PRODUCTS THEREOF

(71) Applicant: Biocoat, Incorporated, Horsham, PA (US)

(72) Inventor: Tyler Richard Long, Royersford, PA (US)

(73) Assignee: BIOCOAT, INCORPORATED, Horsham, PA (US)

(*) Notice: Subject to any disclaimer, the term of this patent is extended or adjusted under 35 U.S.C. 154(b) by 706 days.

(21) Appl. No.: 17/811,115

(22) Filed: Jul. 7, 2022

(65) Prior Publication Data
US 2023/0027324 A1 Jan. 26, 2023

Related U.S. Application Data

(60) Provisional application No. 63/221,177, filed on Jul. 13, 2021.

(51) Int. Cl.
*A61L 29/08* (2006.01)
*A61L 29/04* (2006.01)
(Continued)

(52) U.S. Cl.
CPC ........... *A61L 29/085* (2013.01); *A61L 29/041* (2013.01); *A61L 29/043* (2013.01); *A61L 29/14* (2013.01); *C07C 229/12* (2013.01); *C08K 5/175* (2013.01); *C10M 107/42* (2013.01); *C10M 145/40* (2013.01); *A61L 2400/10* (2013.01);
(Continued)

(58) Field of Classification Search
None
See application file for complete search history.

(56) References Cited

U.S. PATENT DOCUMENTS

| | | |
|---|---|---|
| 2002/0037984 A1 | 3/2002 | Vanderbilt |
| 2007/0032882 A1 | 2/2007 | Lodhi et al. |
| (Continued) | | |

FOREIGN PATENT DOCUMENTS

| | | |
|---|---|---|
| JP | 576652 A | 4/1982 |
| JP | 576765 A | 4/1982 |
| (Continued) | | |

OTHER PUBLICATIONS

Mario Gleria, et al.; entitled "Oxazoline-containing phosphazene derivatives. Part I: the case of hexakis(4-oxazolinophenoxy)cyclophosphazene"; Designed Monomers And Polymers; vol. 4; No. 3; Jan. 1, 2001; pp. 219-238.

*Primary Examiner* — Peter A Salamon
(74) *Attorney, Agent, or Firm* — BakerHostetler

(57) ABSTRACT

Multifunctional crosslinkers are a reaction product between a polyaziridine compound and two or more functionalized benzophenones. The polyaziridine compound is linked to the functionalized benzophenones through two or more reacted aziridine groups. Coating compositions, comprising: a polymer, and multifunctional crosslinkers. Coated medical devices, comprise a lubricious coating bonded adjacent to an exterior surface of the medical device. The lubricious coating is prepared by UV-curing a coating composition, wherein the coating composition comprises: a water/isopropyl alcohol (IPA) soluble polymer and/or a UV-curable polymer, and a water/IPA soluble multifunctional crosslinker.

8 Claims, 7 Drawing Sheets

(51) Int. Cl.
   *A61L 29/14*     (2006.01)
   *C07C 229/12*    (2006.01)
   *C08K 5/17*      (2006.01)
   *C10M 107/42*    (2006.01)
   *C10M 145/40*    (2006.01)
   *C10N 40/00*     (2006.01)
   *C10N 50/08*     (2006.01)

(52) U.S. Cl.
   CPC ...... *A61L 2420/06* (2013.01); *C10M 2209/12* (2013.01); *C10M 2217/0285* (2013.01); *C10N 2040/50* (2020.05); *C10N 2050/08* (2013.01)

(56) References Cited

U.S. PATENT DOCUMENTS

| | | |
|---|---|---|
| 2007/0141365 A1 | 6/2007 | Jelle et al. |
| 2007/0286959 A1 | 12/2007 | Palmer |
| 2011/0063567 A1 | 3/2011 | Domschke et al. |
| 2011/0134387 A1 | 6/2011 | Samuel et al. |
| 2012/0178872 A1 | 7/2012 | Blanquer et al. |
| 2017/0281831 A1 | 10/2017 | Militello |
| 2021/0115349 A1* | 4/2021 | Long ........................ A61L 29/14 |
| 2021/0115350 A1* | 4/2021 | Long ........................ A61L 2/206 |

FOREIGN PATENT DOCUMENTS

| | | |
|---|---|---|
| JP | S5767651 A | 4/1982 |
| JP | S5767652 A | 4/1982 |
| WO | 2010129328 A2 | 11/2010 |
| WO | 2013109930 A1 | 7/2013 |

\* cited by examiner

MULTIFUNCTIONAL CROSSLINKERS: COMPOUNDS, COMPOSITIONS, AND PRODUCTS THEREOF

CROSS REFERENCE TO RELATED APPLICATIONS

The present application hereby claims the benefit of the provisional patent application of the same title, Ser. No. 63/221,177, filed on Jul. 13, 2021, the disclosure of which is herein incorporated by reference in its entirety.

FIELD OF THE INVENTION

The disclosed invention is in the field of multifunctional crosslinkers. The disclosed invention is also in the field of coatings and coated articles prepared using multifunctional crosslinkers.

BACKGROUND OF THE INVENTION

Coatings are important materials used in many applications. Coating formulations generally include a variety of compounds, including, but not limited to, polymers, monomers, crosslinkers, initiators, and solvents. Many coating formulations require the use of organic solvents to dissolve the polymers, monomers, crosslinkers, initiators, etc., to form a homogenous fluid coating formulation that can be adequately applied using any of a variety of coating techniques, and which is then subsequently cured into the solid coating. For example, benzophenone is a common initiator for use in coating formulations but is insoluble in water. Accordingly, many coating formulations which desirably incorporate benzophenone must also include an organic solvent in the formulation. Unfortunately, many organic solvents are incompatible with plastic substrates or the coating method. Most organic solvents are also volatile organic compounds (VOCs) that pose a danger to both human health and the environment. Accordingly, there is a continuing need to develop aqueous-based coating formulations which use mostly water as the primary solvent. For example, there is a need to develop water-soluble crosslinking compounds which can be used in aqueous-based coating formulations. The disclosed inventions are directed to these and other important needs.

SUMMARY OF THE INVENTION

The present invention provides multifunctional crosslinkers. The multifunctional crosslinkers are a reaction product between a polyaziridine compound and two or more functionalized benzophenones. The polyaziridine compound is linked to the functionalized benzophenones through two or more reacted aziridine groups.

The present invention also provides coating compositions, comprising: a polymer, and multifunctional crosslinkers. The multifunctional crosslinkers are a reaction product between a polyaziridine compound and two or more functionalized benzophenones. The polyaziridine compound is linked to the functionalized benzophenones through two or more reacted aziridine groups.

The present invention also provides coated medical devices, comprising a lubricious coating bonded adjacent to an exterior surface of the medical device. The lubricious coating is prepared by UV-curing a coating composition, wherein the coating composition comprises: a water/isopropyl alcohol (IPA) soluble polymer and/or a UV-curable polymer, and a water/IPA soluble multifunctional crosslinker. The multifunctional crosslinkers are a reaction product between a polyaziridine compound and two or more functionalized benzophenones. The polyaziridine compound is linked to the functionalized benzophenones through two or more reacted aziridine groups.

The general description and the following detailed description are exemplary and explanatory only and are not restrictive of the invention, as defined in the appended claims. Other aspects of the present invention will be apparent to those skilled in the art in view of the detailed description of the invention as provided herein.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and devices disclosed. In addition, the drawings are not necessarily drawn to scale. In the drawings.

DETAILED DESCRIPTION OF ILLUSTRATIVE EMBODIMENTS

Figure 1:
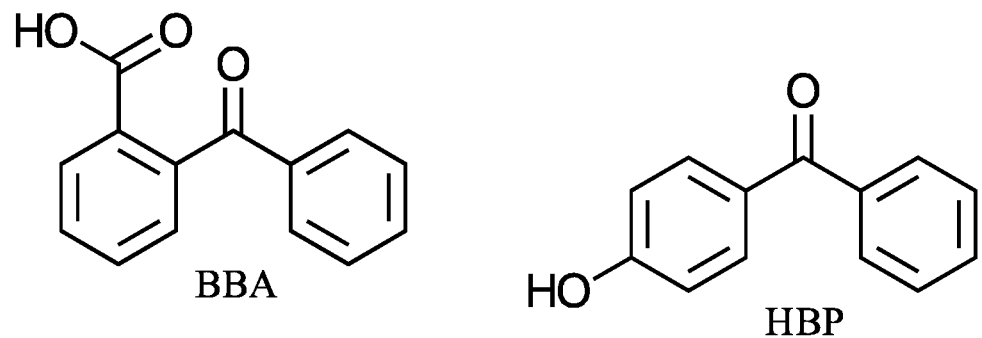
FIG. 1 illustrates exemplary benzophenone-containing reactants 2-benzoylbenzoic acid and 4-hydroxybenzophenone.
Figure 2:
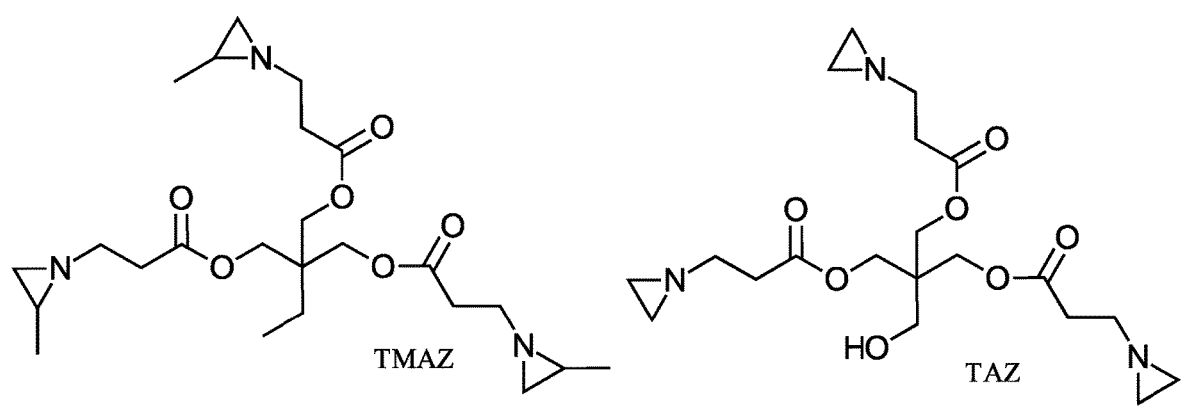
FIG. 2 depicts two examples of polyfunctional aziridine reactants useful in preparing embodiments of the compounds and coating formulations of the present invention: a tri(methylaziridine) [Trimethylolpropane tris(2-methyl-1-aziridine propionate)] (TMAZ) and a Triaziridine [Pentaerythritol Tris (3-(1-Aziridinyl) Propionate] (TAZ)
Figure 3:
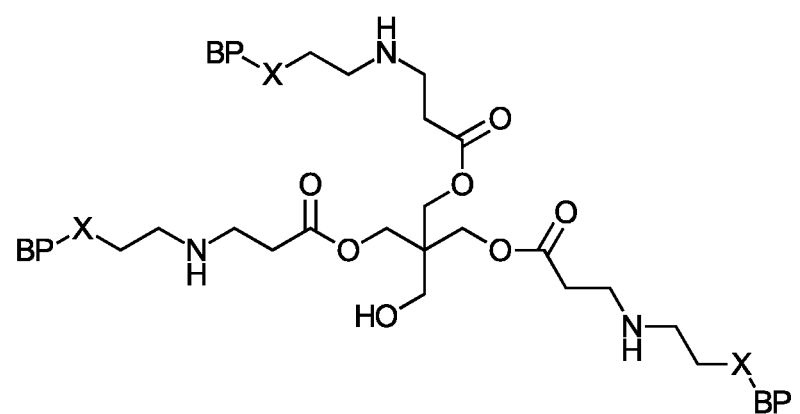
FIG. 3 depicts an example of a resulting photoactive crosslinker after reacting one of the benzophenones in FIG. 1 with TAZ in FIG. 2, where X can be —O—, or —$CO_2$—. The photoactive and water-soluble crosslinker can be the neutral form or the HCl salt form. Depending on the reaction conditions dimers, trimers, and tetramers can form when polyaziridines react together.
Figure 4:
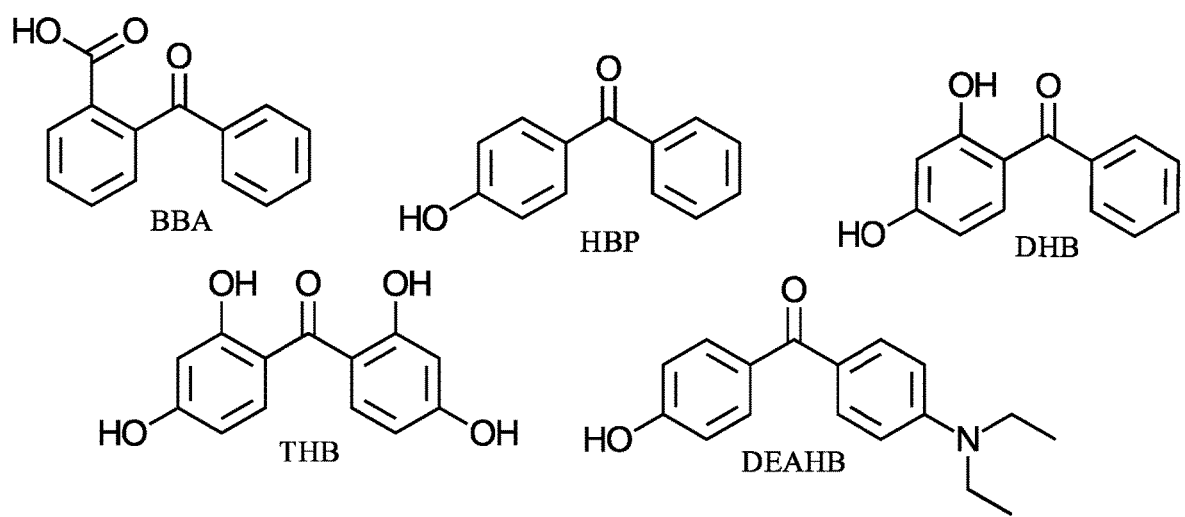
FIG. 4 depicts examples of Benzophenone derivatives which can be used to make the multifunctional water-soluble crosslinkers according to the present invention. Examples of such Benzophenone derivatives include: 2-Benzoylbenzoic acid (BBA), 4-Hydroxybenzophenone (HBP), 2,4-Dihydroxybenzophenone (DHB), 2,2',4,4'-Tetrahydroxybenzophenone (THB), and 4'-Hydroxy-4-N,N-diethylaminobenzophenone (DEAHB).

Polyaziridine compounds can be used to crosslink acrylic and polyurethane resins by reacting a carboxylic acid with an aziridine group. The more than one aziridine group of the polyaziridine allows reactions between more than one polymer forming crosslinks. This reaction occurs at room temperature but aziridine can also react with phenol under the right conditions. Polyaziridine compounds were reacted with functionalized benzophenones to create multifunctional crosslinkers. These multifunctional crosslinkers may be combined with water-soluble polymers and/or photoactive water-soluble polymers to formulate UV curable coatings for medical devices. In some embodiments, the multifunctional crosslinker is photoactive. Such coatings are crosslinked into a hydrogel on the surface of medical devices, making such devices lubricious so they can easily move through body tissues, minimizing damage to the body and making medical procedures easier to perform. Exemplary polyaziridines include trimethylolpropane tris(2-methyl-1-aziridine propionate) (TMAZ) and pentaerythritol tris (3-(1-aziridinyl) propionate (TAZ); available from PolyAziridine LLC, Palm Beach, FL 33480 (https://polyaziridine.com/) (FIG. 2).

The multifunctional crosslinker is a reaction product between a polyaziridine compound and two or more functionalized benzophenones. The polyaziridine compound is linked to the functionalized benzophenones through two or more reacted aziridine groups. The aziridine group is a three membered heterocycle with a nitrogen. A reacted aziridine group has the three membered ring opened. The product of the reaction of benzophenone derivatives and aziridine compounds to prepare the multifunctional crosslinkers is denoted by the abbreviation of the benzophenone derivative and the abbreviation of the polyaziridine derivative (i.e., the product of the reaction between HBP and TAZ is denoted as HBP-TAZ).

The multifunctional crosslinkers described herein may be combined with water-soluble polymer and/or photoactive water-soluble polymer to make a water-soluble UV curable coating for medical devices. These coatings crosslink into a hydrogel on the surface of medical devices making it lubricious so it can easily move through body tissues, causing less damage to the tissue and making the medical procedure easier to perform.

The multifunctional crosslinkers are useful for making coatings, especially aqueous-based coatings and UV-curable coatings. Such coatings can be formulated specifically for preparing lubricious coatings for medical devices that enter the body.

Examples of polyaziridines for use in making the multifunctional crosslinker are: N,N'-(methylenedi-p-phenylene) bis(aziridine-1-carboxamide) (DAZ), trimethylolpropane bis(2-methyl-1-aziridine propionate), trimethylolpropane tris(2-methyl-1-aziridine propionate) (TMAZ), pentaerythritol bis(3-(1-aziridinyl) propionate, pentaerythritol tris(3-(1-aziridinyl) propionate (TAZ), and pentaerythritol tetrakis (3-(1-aziridinyl) propionate. Also suitable are the mixtures of polyaziridines of different functionality that are commercially available. In some embodiments, the polyaziridine comprises TAZ or TMAZ.

In certain embodiments it is desirable that the polyaziridine comprises two, three, or four aziridine groups, which in turn can be used to prepare multifunctional crosslinnkers having two, three, or four benzophenone functional groups. For example, some compounds according to the present invention can comprise, individually, or as a mixture, two, three, or four functionalized benzophenones each individually linked to two, three, or four reacted aziridine groups. In some embodiments, the multifunctional crosslinker comprises two functionalized benzophenones. In some embodiments, the multifunctional crosslinker comprises three functionalized benzophenones. In some embodiments, the multifunctional crosslinker comprises four functionalized benzophenones.

It should be appreciated that the method of preparation and the functional group on the benzophenone will give a different activity. Where the activity is the number of aziridine groups that reacted with the benzophenone compared to the total theoretical amount of aziridine groups. The aziridine groups that do not react with a benzophenone compound can react with the secondary amine formed from the reaction between the aziridine and the benzophenone forming a dimer of the polyaziridine (FIG. 6, PZ represents the rest of the two polyaziridines). The aziridine groups that do not react with benzophenone can react with the acidic water it is exposed to during purification. These side reactions can give a mixture of products which is best described by their activity. Activity is the amount of aziridine group reacted with the benzophenone divided by the total amount of aziridine groups. The activity of the product can be between 25% and 100%, such as 35% to 100%, 35% to 55%, 55% to 75%, and 75% to 100%. The activity of the product can also be adjusted by the reaction temperature. In certain embodiments it is desirable to purify the multifunctional crosslinker by removing at least a portion of any unlinked benzophenone groups. Because benzophenone is generally insoluble in water, water and water/alcohol solutions (e.g., 50:50 based on wt. water:isopropyl alcohol) can be used to extract the multifunctional crosslinker and separate out a majority of the unreacted and water-insoluble benzophenone.

Examples of functionalized benzophenones for preparing the multifunctional crosslinker can comprise one or more functionalities selected from: a phenol group, a carboxylic acid group, a hydroxyl group, thiol group, amine group, and aniline group. In some embodiments the functionalized benzophenones are selected from: 4-hydroxybenzophenone (HBP), 2,4-dihydroxybenzophenone (DHB), 2,2',4,4'-tetrahydroxybenzophenone, 2,2'-dihydroxy-4-methoxybenzophenone, 2,3,4-trihydroxybenzophenone, 4,4'-dihydroxybenzophenone, 2,4,4'-trihydroxybenzophenone, 4'-hydroxy-2,4-dimethoxybenzophenone, 2-4-(dibutylamino)-2-hydroxybenzoylbenzoic acid, 2-(4-diethylamino-2-hydroxybenzoyl)benzoic acid, 2-(4-hydroxybenzoyl) benzoic acid, 4-benzoylbenzoic acid, 3-benzoylbenzoic acid, 2-benzoylbenzoic acid (BBA), 4-aminobenzophenone, 3-aminobenzophenone, 2-aminobenzophenone, 2-aminobenzophenone-2'-carboxylic acid, 4-benzoyl benzylamine hydrochloride, 4'-hydroxy-N,N-diethylaminobenzophenone, 4'-hydroxy-N,N-dimethylaminobenzophenone, 4'-hydroxy-N,N-dihydroxyethylaminobenzophenone thioxathone-2-carboxylic acid, and 2-mercaptothioxanthone. Functionalized benzophenones incorporating Cl, Br, $CH_3$, OH, OR, $NH_2$, $NR_2$, SH, and COOH substitutions are also examples that may be reacted with polyaziridines to form multifunctional photocrosslinkers.

Figure 5:
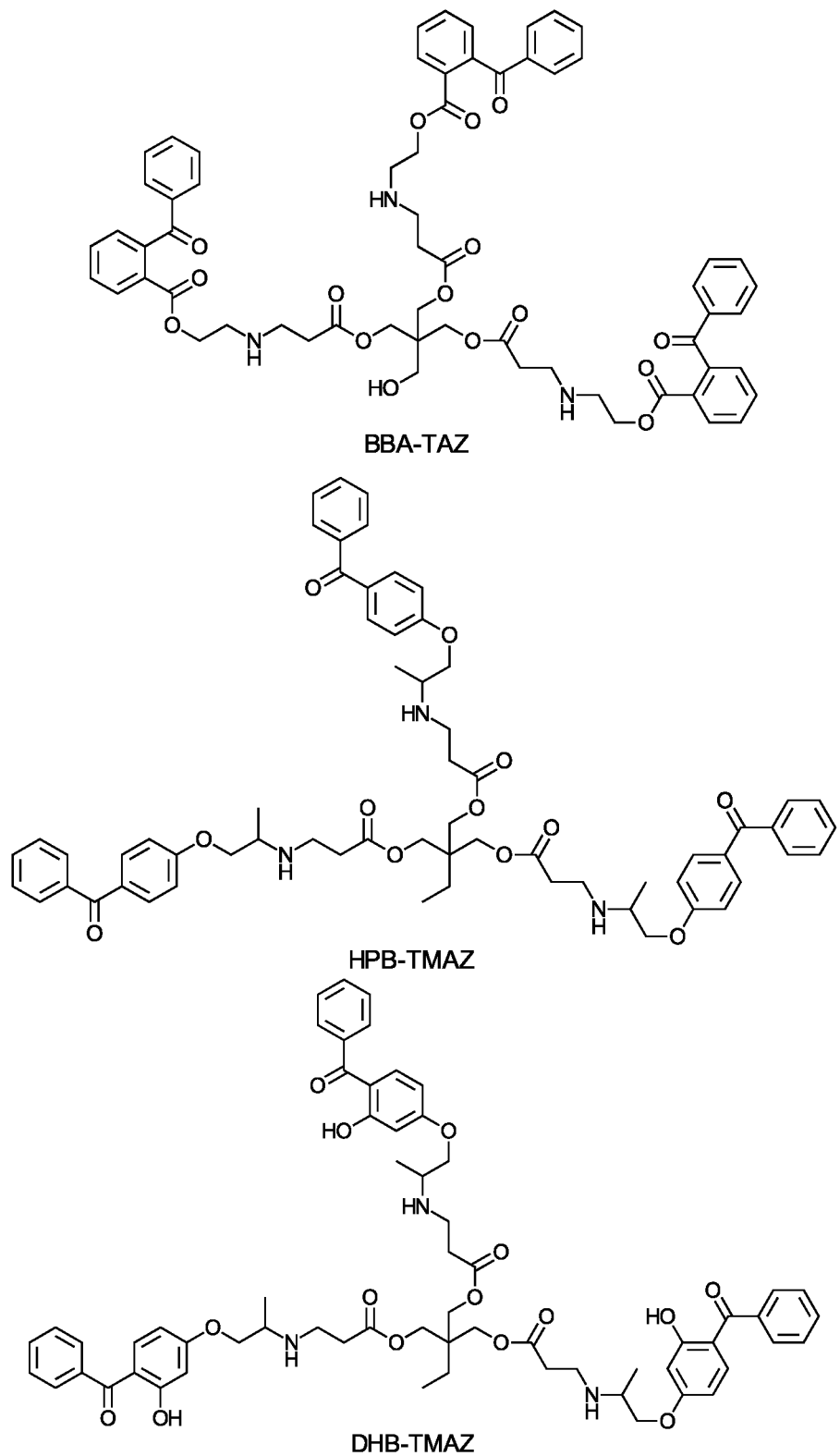
FIG. 5 illustrates embodiments of the present invention that are directed to three photoactive and water-soluble crosslinkers BBA-TAZ, HPB-TMAZ, and DHB-TMAZ.

Examples of multifunctional crosslinkers include the compounds "HBP-TMAZ", "BBA-TAZ", and "DHB-TMAZ", as illustrated in FIG. 5. In some embodiments the multifunctional crosslinkers are capable of generating free radicals upon exposure to ultraviolet radiation, i.e., the multifunctional crosslinkers are UV-curable.

In some embodiments, the multifunctional crosslinker is soluble in water and/or water/IPA mixtures. For example, in some embodiments the compound is soluble in water or in water/IPA mixtures at a weight ratio of between 5% and 95% wt. In some embodiments, the compound is soluble in water at a weight ratio of between 5% and 95% wt. Unless otherwise indicated, the terms solubility and miscibility are synonymous with respect to forming a single phase of a compound dissolved in an indicated solvent, such as water or water/IPA mixtures.

The present invention also provides water-soluble coating compositions, comprising: a polymer, and the multifunctional crosslinker Examples of photocurable polymers used in the water-soluble coating compositions can be any of a variety of polymers derived from monomer units selected from photo-active monomers such as: 4-methacryloxy-2-hydroxybenzophenone, 4-acryloxybenzophenone, 4-methacryloxybenzophenone, acrylamidobenzophenone, methacrylamidobenzophenone, 2-hydroxy-4-acryloxyethoxybenzophenone, 2,4-dihydroxy-4'-vinyl benzophenone, and 2-hydroxy-4-methacryloxyethoxybenzophenone. In some embodiments, the monomers may comprise monomers for hydrophilic polymers such as acrylic acid (AA), methacrylic acid, 2-ethylacrylic acid, 2-propylacrylic acid, acryloxypropionic acid, isocrotonic acid, maleic anhydride, maleic acid, 2-acrylamido-2-methyl-1-propanesulfonic acid, N-(2-hydroxyethyl)acrylamide (HEAA), 2-hydroxyethyl methacrylate, 2-hydroxypropyl acrylate, 2-hydroxypropyl methacrylate, N-(2-hydroxyethyl) methacrylamide, N-acryloylamidoethoxyethanol, N-(hydroxymethyl) acrylamide, N-[tris(hydroxymethyl)methyl]acrylamide, 4-hydroxybutyl acrylate, hydroxypropyl acrylate, methyl 3-hydroxy-2-methylenebutyrate, hydroxypropyl methacrylate, 2-allyloxyethanol, 3-allyloxy-1,2-propanediol, 1,4-butanediol vinyl ether, di(ethylene glycol)vinyl ether, ethylene glycol vinyl ether, N,N-1,2-dihydroxyethylene-bis-acrylamide, N,N-1,2-dihydroxyethylene-bis-methyacrylamide, N-hydroxymethyl methacrylamide, N-tri(hydroxymethyl)-methylmethacrylamide, N-Vinylpyrrolidone, and 2-ethyl-2-oxazoline. In some embodiments, the photo-active monomers comprise at least one of 4-methacryloxy-2-hydroxybenzophenone, acrylic acid, N-(2-hydroxyethyl)acrylamide, and N-vinylpyrrolidone.

Suitable polymers that are useful in the coating embodiments can also be selected from the group comprising poly(HEAA-co-AA), poly(HEAA-co-AA-co-MHB), polyvinylpyrrolidone (PVP), polyacrylamides, poly(acrylic acid), poly(methyl vinyl ether (MVE)-maleic acid), poly(2-ethyl-2-oxazoline), poly(butadiene/maleic acid), and dextrin.

Additional components can also be added to coating formulation embodiments, such as hyaluronic acid, heparin and any of a variety of surfactants. Suitable surfactants include sodium lauryl sulfate (SLS), sodium dodecyl sulfate (SDS), non-ionic surfactants such as the Tergitol™ and the Triton™ families that are commercially available from Dow Chemical, Inc.

In some embodiments the coating compositions are aqueous in nature, meaning that they comprise water. The water content of the coating compositions may be characterized in terms of weight percent of water in the coating, based on the total weight of the coating. In some embodiments, the water content ranges from about 50% to about 99.5% by weight of the total composition. Examples of water content include at least 55%, at least 60%, at least 65%, at least 70%, at least 75%, at least 80%, at least 85%, at least 90%, and even at least 95% by weight of the total coating composition.

In some embodiments the total weight of "not solvent" components of the coating compositions are in the range of 0.5% to 15 wt % based on the total weight of the composition. Such as 1% to 10% and 1% to 3%.

In some embodiments, the inventive aqueous coating compositions further comprise a solvent other than water, wherein the weight percent of the solvent other than water is greater than 0% to 50% by weight of the total composition, such as 0.5% to 50%, 0.5% to 45%, 0.5% to 40%, 0.5% to 35%, 0.5% to 30%, 0.5% to 25%, 0.5% to 20%, 0.5% to 15%, 0.5% to 10%, 0.5% to 5%, and 0.5% to 2%. Examples of solvents other that water include ethanol, methanol, THF, and isopropyl alcohol. In some embodiments, the solvent other than water is isopropyl alcohol. In some embodiments, the solvent other than water is at least 50% by wt. miscible in water.

Many coatings that are desirable for medical devices are characterized as being lubricious. Accordingly, some embodiments include a lubricious coating prepared by UV-curing a coating composition of as described herein. As such, some embodiments of coatings can be characterized as having a lubricity of less than 40 g and a durability of less than 40 g, when measured according to a pinch test with 500 g applied load. In some embodiments the lubricity of the coatings can be even lower, e.g., less than: 30 g, 25 g, 20 g, 15 g, 10 g, or 5 g. In some embodiments the durability of the coatings can be even lower, e.g., less than: 30 g, 25 g, 20 g, 15 g, 10 g, or 5 g. A pinch test result is measured with a Tinius Olsen 5ST Electromechanical Testing Machine with a 10N load cell and collect data using Horizon software.

The present invention also provides coated medical devices, comprising a lubricious coating bonded adjacent to an exterior surface of a medical device. The lubricious coating is prepared by curing an aqueous coating composition that has been suitably applied to a medical device. The aqueous coating composition prior to curing comprises: a water/isopropyl alcohol (IPA) soluble polymer and/or a UV-curable polymer, and the multifunctional crosslinker. The aqueous coating composition prior to curing being homogenously dissolved in an aqueous solvent solution of water and IPA. In some embodiments, the aqueous solvent solution comprises at least 50:50 by weight water:IPA, wherein the multifunctional crosslinker comprises a multifunctional aziridine linked via two or more of its reacted aziridine groups to two or more functionalized benzophenones. Any of the embodiments of multifunctional crosslinkers described throughout this specification, including mixtures of such multifunctional crosslinkers, can be used to provide the uncured aqueous coating compositions useful for preparing the coated medical devices having a cured lubricious coating.

In some embodiments, the coated medical devices will advantageously incorporate any of the embodiments of cured lubricious coatings as described throughout this specification. For example, suitable coated medical devices can incorporate coatings that have a lubricity of less than 40 g and a durability of less than 40 g, when measured according to a pinch test with 500 g applied. Even more preferably, in some embodiments the lubricity of a cured coating on an embodiment of a medical device can be even lower, e.g., less than: 30 g, 25 g, 20 g, 15 g, 10 g, or 5 g. In some embodiments the durability of the coatings can be even lower, e.g., less than: 30 g, 25 g, 20 g, 15 g, 10 g, or 5 g.

It should be well envisioned by the skilled person in the art that any of a variety of medical devices that are placed or inserted into the body or any type of biological tissue can be advantageously coated using the coating formulations and methods described throughout this specification. For example, suitable medical devices include, but are not limited to, catheters, guidewires, mechanical heart valves, ventricular assist devices, implantable artificial hearts, vascular grafts, stents, electrodes, implant insertion devices, microfluidic diagnostic devices, and the like.

When ranges are used herein for physical properties, such as molecular weight, or chemical properties, such as chemical formulae, all combinations, and sub-combinations of ranges for specific embodiments therein are intended to be included.

The disclosures of each patent, patent application, and publication cited or described in this document are hereby incorporated herein by reference, in its entirety.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range.

EXAMPLES

Coating solutions were prepared having 1% to 3% non-photoactive polymer, 0% to 1% of a photoactive polymer and 0.05% to 0.5% of a photoactive crosslinker (n.b., unless otherwise stated, all percentages are based on weight). Non-photoactive polymers used are poly(HEAA-co-AA) as described in U.S. patent application Ser. No. 17/075,965 as well as commercially available water soluble polymers such as polyvinylpyrrolidone (PVP). The photoactive polymer used was poly(HEAA-co-AA-co-MHB) described in U.S. patent application Ser. No. 17/075,965. Where HEAA is N-hydroxyethyl acrylamide, AA is acrylic acid, and MHB is 4-methacryloxy-2-hydroxybenzphenone. The photoactive crosslinker used are described above. Other non-photoactive water soluble polymers that can be incorporated in the coating formulation include, but are not limited to, hyaluronic acid, poly(2-ethyl-2-oxazoline), poly(butadiene/maleic acid), poly(Acrylic acid), and poly(4-styrenesulfonic acid).

Example 1

Procedure—2-BBA-TAZ

Figure 7:
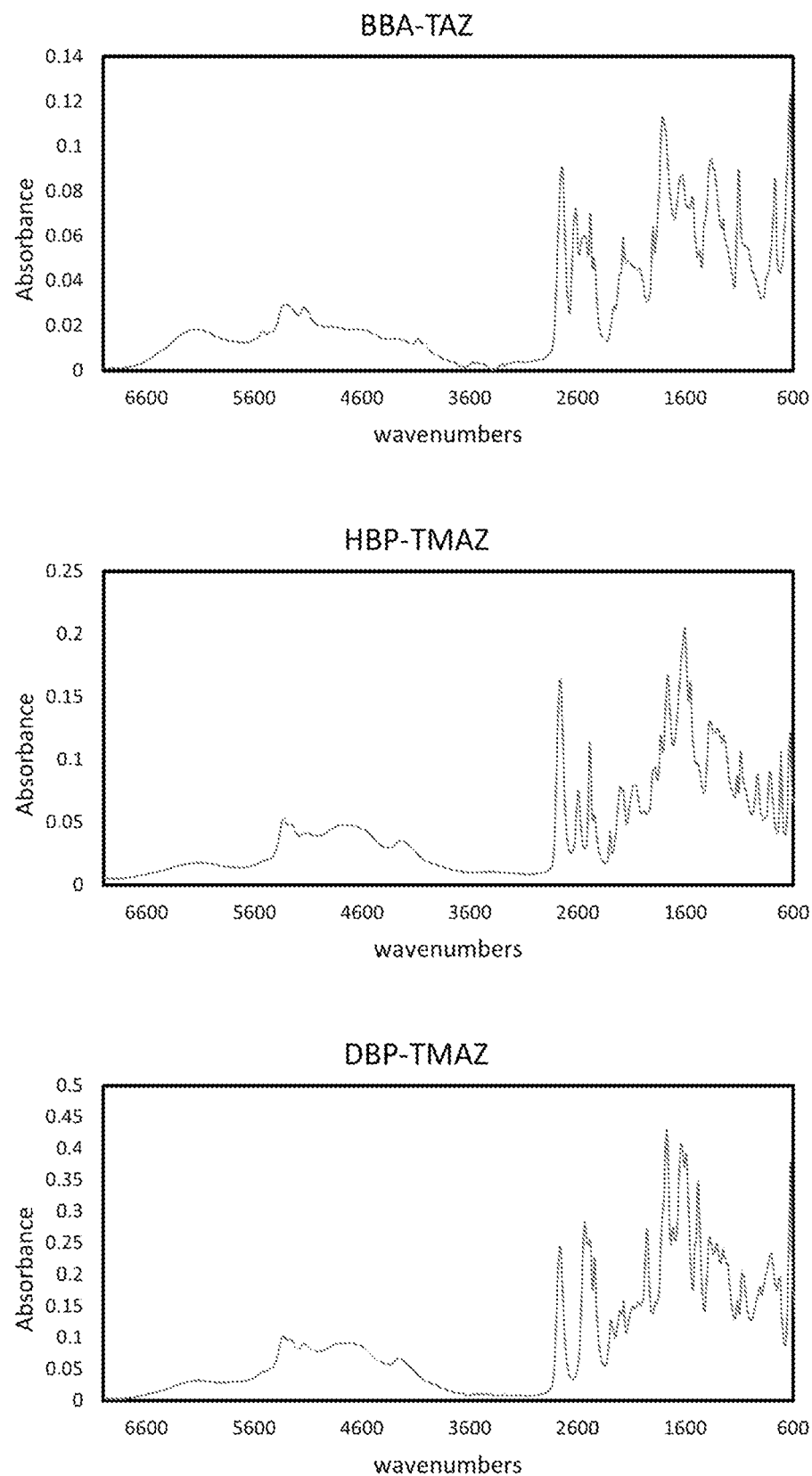
FIG. 7 show the FTIR spectra of BBA-TAZ, HBP-TMAZ, and DHB-TMAZ.

2-BBA-TAZ was made by dissolving (5.66 g, 25 mmol) 2-BBA in 30 mL of THF. Add (2.14 g, 5 mmol) of TAZ and heat to reflux for 24 hours. The solvent was removed under reduced pressure. The crude product was taken up with 27.5 mL of 1M NaOH and 30 mL of water. The product was extracted with 3×50 mL of ethyl acetate. The product was dried and crushed into a powder. Yield was 47%. The UV spectra of a 0.00416% solution in 30% IPA in water had a max absorbance at 252 nm. FTIR in FIG. 7.

Example 2

Procedure—HBP-TAZ

HBP-TAZ was made by dissolving (15.00 g, 75 mmol) of HBP in 25 mL of THF. (5.86 g, 12.5 mmol) PZ28 was added with 100 mL of THF. The solution was placed in an ice bath for 1 hr then reacted at room temperature for 24 hours. The reaction was then refluxed for an additional 24 hrs. The solution was cooled and the THF was removed under reduced pressure. The residue was transferred to a separatory funnel with 100 mL of EtOAc, 33 mL of 1 N HCl, and 50 mL of water. The impurities were removed with two extractions of 100 mL of EtOAc. The aqueous layer was subsequently dried in a room temperate vacuum oven and then redissolved in IPA and dried at 40° C. in a vacuum oven. The yield was 75.96%. The UV spectra of a 0.00410% solution in 30% IPA in water had absorbances at 291 nm. FTIR in FIG. 7.

Example 3

Procedure—DHB-TAZ

DHB-TMAZ was made by dissolving (30.00 g, 140 mmol) of DHB in 50 mL of THF. (11.70 g, 25 mmol) PZ28 was added with 200 mL of THF. The solution was heated to reflux for 48 hours. The solution was cooled and the THF was removed under reduced pressure. The residue was transferred to a separatory funnel with 250 mL of EtOAc, 82.5 mL of 1 N HCl, and 125 mL of water. The impurities were removed with two extractions of 250 mL of EtOAc. The aqueous layer was subsequently dried in a room temperature vacuum oven and then redissolved in IPA and dried at 40° C. in a vacuum oven. The yield was 78.24%. The UV spectra of a 0.00410% solution in 30% IPA in water had absorbances at 291 nm and 325 nm. FTIR in FIG. 7. The FTIR indicates that the material contains both benzophenone and polyaziridine components.

TABLE 1

| | Benzophenone | Polyaziridine | Eq ratio | UV abs | Activation | Yield |
|---|---|---|---|---|---|---|
| 1 | 2-BBA | TAZ | 5:1 | 252 nm | 100% | 47% |
| 2 | HBP | TMAZ | 6:1 | 292 nm | 44% | 76% |
| 3 | DHB | TMAZ | 6:1 | 291 nm, 325 nm | 72% | 78% |

Table 1 shows the benzophenone derivative and the polyaziridine used in the reaction and the mole ratio of the two reagents. Polyaziridine is the limiting reagent and it is used to calculate the yield. The yield calculation assumes that all the aziridines are reacted. The activation calculation was done by comparing the UV-vis absorbance of the crosslinker to the theoretical absorbance the crosslinker would have if all the aziridine groups reacted with the benzophenone derivative.

Figure 6:
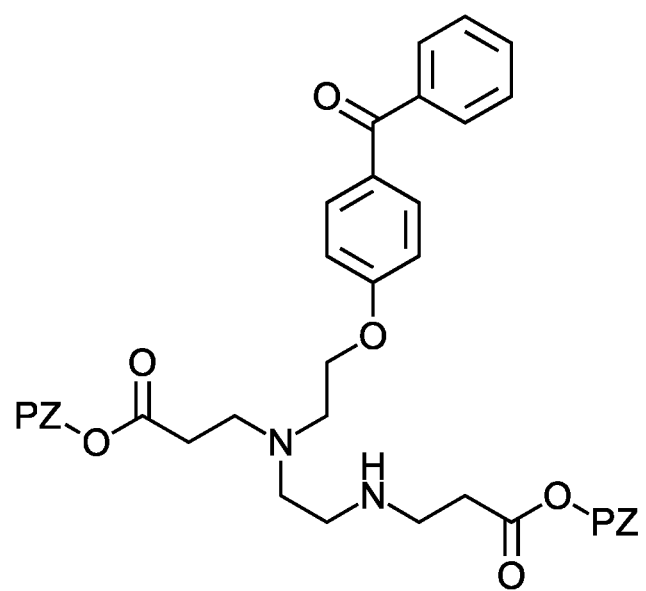
FIG. 6 depicts the product of the dimerization reaction where the product of the reaction between a polyaziridine and hydroxybenzophenone reacts with another polyaziridine to form a dimer, where PZ represents the rest of the polyaziridine.

It should be appreciated that the method of preparation and the functional group on the benzophenone will give a different activation. Where the activation is the number of aziridine groups that reacted with the benzophenone compared to the total theoretical amount of aziridine. The aziridine groups that do not react with a benzophenone compound can react with the secondary amine formed from the reaction between the aziridine and the benzophenone forming a dimer of the polyaziridine (FIG. 6). The aziridine groups that do not react with benzophenone can react with the acidic water it is exposed to during purification. These side reactions can give a mixture of products which is best described by their activation. The activation of the product can be between 25% and 100%. The activation of the product can also be adjusted by the reaction temperature and concentration.

Example 4

Coating Solutions

Coatings were applied to a Pebax™ 55D plastic tubing using a dip coating method. The Pebax™ tubing had an outer diameter of 0.079 inches (2.0 mm) and a wall thickness of 0.005 inches (0.13 mm). The tubing was placed over stainless steel rods for stability. The tubing was first dipped into a coating solution extracted at 0.5 inches per second (12.7 mm/s) and was cured in a UV chamber for 5 minutes with an intensity of 90 mW/cm². When a second coat was applied, the tubing was again dipped into the coating solution extracted at 0.7 inches per second and was cured in the same UV chamber for 5 minutes. UV cure was performed in an Uvitron IntelliRay model UV0832 UV Cure unit equipped with a UVA 600 Watt metal halide lamp. Irradiance was measured with an EIT Uvicure Plus II radiometer. This UVA radiometer measures the radiation between 320 and 390 nm.

Example 5

Friction Testing of Coated Plastic Tubing

Tubing was coated as previously described but with the tubing and crosslinker as shown in the table below.

The friction of each coated plastic tube was determined by using a pinch test using a Tinius Olsen 5ST Electromechanical Testing Machine with a 10N load cell. Data was collected using Horizon software. The Tinius Olsen is equipped with a heated water bath and silicone pinch pads that are pressed together at a constant force. The water bath was filled with PBS solution and heated to 37° C. The pinch pads were submerged in the water and pressed together with 500 g of force. The friction was measured as the grams of force required to push and pull the sample through the pads. The lubricity and durability were determined by averaging the grams of force when the samples were pulled through the pads. Lubricity was determined as the average of measurements from cycle 2-4 and durability was determined as the average of measurements from cycle 28-30. Results are provided in Table 2.

TABLE 2

| | Substrate | Polymer | wt % Polymer | Crosslinker | wt % Crosslinker | Lubricity (g) | Durability (g) |
|---|---|---|---|---|---|---|---|
| 1 | Pebax 25D | PVP | 2 | BBA-TAZ | 0.1 | 9.2 ± 10.7 | 47.5 ± 13.8 |
| 2 | PU80A | PVP | 2 | BBA-TAZ | 0.1 | 7.3 ± 0.2 | 13.6 ± 2.7 |
| 3 | LDPE | PVP | 2 | BBA-TAZ | 0.1 | 6.0 ± 0.5 | 8.7 ± 3.3 |
| 4 | SEBS | PVP | 2 | BBA-TAZ | 0.1 | 6.6 ± 0.6 | 12.2 ± 1.2 |
| 5 | PC | PVP | 2 | BBA-TAZ | 0.1 | 4.8 ± 0.9 | 11.5 ± 5.4 |
| 6 | PET | PVP | 2 | BBA-TAZ | 0.1 | 5.8 ± 1.1 | 14.9 ± 3.9 |
| 7 | Pebax 25D | PVP | 2 | HBP-TMAZ | 0.1 | 5.8 ± 0.5 | 6.4 ± 0.7 |
| 8 | PU80A | PVP | 2 | HBP-TMAZ | 0.1 | 6.3 ± 0.4 | 8.2 ± 1.7 |
| 9 | LDPE | PVP | 2 | HBP-TMAZ | 0.1 | 81.0 ± 90.0 | — |
| 10 | SEBS | PVP | 2 | HBP-TMAZ | 0.1 | 27.2 ± 36.3 | 49.1 ± 61.8 |
| 11 | PC | PVP | 2 | HBP-TMAZ | 0.1 | 4.6 ± 0.6 | 7.8 ± 2.9 |
| 12 | PET | PVP | 2 | HBP-TMAZ | 0.1 | 5.5 ± 2.0 | 6.7 ± 3.2 |
| 13 | Pebax 25D | PVP | 2 | DHB-TMAZ | 0.1 | 8.6 ± 1.9 | 24.1 ± 25.6 |
| 14 | PU80A | PVP | 2 | DHB-TMAZ | 0.1 | 23.1 ± 23.1 | — |
| 15 | LDPE | PVP | 2 | DHB-TMAZ | 0.1 | — | — |
| 16 | SEBS | PVP | 2 | DHB-TMAZ | 0.1 | — | — |
| 17 | PC | PVP | 2 | DHB-TMAZ | 0.1 | 25.9 ± 7.5 | — |
| 18 | PET | PVP | 2 | DHB-TMAZ | 0.1 | — | — |

Polymer and crosslinker were dissolved in 30% IPA in water. BBA-TAZ was acidified with HCl before dissolving in IPA/water. The substrates were dipped in the coating solution and cured two times. A dash indicates the frictional force exceeded 300 g. The substrates are Pebax 25D, polyurethane 80A (PU80A), Low density polyethylene (LDPE), Styrene-ethylene-butylene-styrene (SEBS), polycarbonate (PC), and Polyethylene terephthalate (PET).

What is claimed:

1. A multifunctional crosslinker comprising a reaction product between a polyaziridine compound and two or more functionalized benzophenones, wherein the polyaziridine compound is linked to the functionalized benzophenones through two or more reacted aziridine groups, wherein the polyaziridine compound is selected from: N,N'-(methylenedi-p-phenylene)bis(aziridine-1-carboxamide) (DAZ), trimethylolpropane bis(2-methyl-1-aziridine propionate), trimethylolpropane tris(2-methyl-1-aziridine propionate) (TMAZ), pentaerythritol bis(3-(1-aziridinyl) propionate, pentaerythritol tris(3-(1-aziridinyl) propionate (TAZ), pentaerythritol tetrakis(3-(1-aziridinyl) propionate, and combinations thereof.

2. The multifunctional crosslinker of claim 1, wherein the polyaziridine compound comprises, two, three, or four aziridine functional groups.

3. The multifunctional crosslinker of claim 1, wherein the compound comprises two, three, or four functionalized benzophenones each linked through a reacted aziridine group.

4. The multifunctional crosslinker of claim 1, wherein the two or more functionalized benzophenones comprise a functionality selected from: a phenol group, a carboxylic acid group, a hydroxyl group, thiol group, amine group, and aniline group.

5. The multifunctional crosslinker of claim 1, wherein the two or more functionalized benzophenones are selected from: 4-hydroxybenzophenone (HPB), 2,4-dihydroxybenzophenone (DHB), 2,2',4,4'-tetrahydroxybenzophenone, 2,2'-dihydroxy-4-methoxybenzophenone, 2,3,4-trihydroxybenzophenone, 4,4'-dihydroxybenzophenone, 2,4,4'-trihydroxybenzophenone, 4'-hydroxy-2,4-dimethoxybenzophenone, 2-4-(dibutylamino)-2-hydroxybenzoylbenzoic acid, 2-(4-diethylamino-2-hydroxybenzoyl)benzoic acid, 2-(4-hydroxybenzoyl)benzoic acid, 4-benzoylbenzoic acid, 3-benzoylbenzoic acid, 2-benzoylbenzoic acid (BBA), 4-aminobenzophenone, 3-aminobenzophenone, 2-aminobenzophenone, 2-aminobenzophenone-2'-carboxylic acid, 4-benzoyl benzylamine hydrochloride, 4'-hydroxy-N,N-diethylaminobenzophenone, 4'-hydroxy-N,N-dimethylaminobenzophenone, 4'-hydroxy-N,N-dihydroxyethylaminobenzophenone thioxathone-2-carboxylic acid, 2-mercaptothioxanthone, and combinations thereof.

6. The multifunctional crosslinker of claim 1, wherein the multifunctional crosslinker is HBP-TMAZ, BBA-TAZ, DHB-TMAZ, and combinations thereof.

7. The multifunctional crosslinker of claim 1, wherein the multifunctional crosslinker generates free radicals upon exposure to ultraviolet radiation and crosslinks via hydrogen extraction.

8. The multifunctional crosslinker of claim 1, wherein the multifunctional crosslinker is soluble in water or water/IPA at a weight ratio of between 5% and 95% by wt.

* * * * *